United States Patent [19]

Diele

[11] Patent Number: 4,747,267
[45] Date of Patent: May 31, 1988

[54] HYDRODYNAMIC COUPLING

[75] Inventor: Karl-Heinz Diele, Ellrichshausen, Fed. Rep. of Germany

[73] Assignee: Voith Turbo GmbH, Crailsheim, Fed. Rep. of Germany

[21] Appl. No.: 66,771

[22] Filed: Jun. 25, 1987

[30] Foreign Application Priority Data

Jun. 30, 1986 [DE] Fed. Rep. of Germany ....... 3621905

[51] Int. Cl.⁴ ............................................. F16D 33/02
[52] U.S. Cl. ................................... 60/351; 415/213 T
[58] Field of Search ................. 60/347, 351, 357, 330; 415/53 T, 213 T

[56] References Cited

U.S. PATENT DOCUMENTS 3,521,451  7/1970  Langlois ................................ 60/351
3,646,756  3/1972  Langlois .......................... 60/351 X Primary Examiner—Edward K. Look
Attorney, Agent, or Firm—Ostrolenk, Faber, Gerb & Soffen

[57] ABSTRACT

A hydrodynamic coupling, whose degree of filling is determined by a scoop tube, has a plurality of radially arranged elongated depressions on the inner surface of the coupling casing (simultaneously forming a scoop chamber) driven on the primary side. These depressions have the purpose of efficiently causing rotation of the oil ring formed inside the scoop tube chamber so that the oil ring rotates as far as possible at the same speed as the coupling casing. Owing to the small size of the radial depressions in a fine arrangement on the inner surface of the coupling casing the occurrence of pressure fluctuations at the scoop tube and the hydraulic system downstream therefrom is avoided.

11 Claims, 1 Drawing Sheet

HYDRODYNAMIC COUPLING

The invention relates to hydrodynamic coupling with a scoop tube enabling it to be emptied in accordance with the preamble of claim 1. A coupling of this type is described in the German patent No. 977,505.

In such a coupling the coupling liquid is located both within the toroidal operating space, which is defined by the blade carrying hubs, i.e. the primary hub and the secondary hub, and also in a scoop tube chamber in which is located alongside the operating space. This scoop tube chamber is as a rule delimited on the outside by a casing rotating with the primary blade carrying hub, into which there extends a non-rotary scoop tube aligned in a generally radial direction and continuously drawing off a part of the transmission liquid. Couplings have been proposed having a stationary or radially adustable scoop tube by means of which the degree of filling of the hydrodynamic coupling and thus speed of rotation and the torque characteristic may be altered. The removal of the transmission liquid from the scoop tube chamber and further transport of the liquid into the subsequent tube and automatic control system takes place because of the effect of the back pressure of the liquid at the inlet into the scoop tube. In this respect it is important that the flow of liquid to the scoop tube be as even as possible. If this is not the case, pressure fluctuations may occur throughout the said tube system, something leading to interference with the subsequent automatic control system. It is established that an even flow of the transmission liquid into the inlet port of the scoop tube may be obtained providing that the liquid rotating in the scoop tube chamber assume, as far as possible, the same speed of rotation as the rotating housing parts.

However this aim has not been attained to the degree desired as will be seen from the following explanations:

A. In the prior art coupling as shown in FIG. 1 of the German patent No. 977,505 the scoop tube chamber is arranged at the back side of the pump hub; that is to say, the scoop tube chamber is delimited by the back side of the pump hub and a part of the coupling casing secured to the pump hub so that all the walls delimiting the scoop tube chamber turn at the same speed. Although there is then the effect that—in combination with blades arranged on the inner side of the casing wall normal to the axis—the transmission liquid present in the scoop tube chamber will rotate at generally the same speed as the primary hub and the coupling casing, there is the disadvantage in the design that a double coupling casing is needed; that is to say, the primary blade carrying hub not only has the coupling casing mentioned provided for forming the scoop tube chamber secured to it but also the second coupling casing surrounding the secondary blade carrying hub. The resulting high costs of manufacture and the increase in weight meant that this design of coupling had to be abandoned.

B. FIG. 2 of the said German patent No. 977,505 further shows a design in which the scoop tube chamber is delimited on the one hand by the back side of the secondary blade carrying hub and on the other hand by the coupling casing secured to the primary blade carrying hub. An advantage of this design is that only a single coupling casing is needed. There is however the disadvantage that the limiting walls of the scoop tube chamber rotate at different speeds; for it is well known that the secondary blade carrying hub rotates, even during continuous operation, at a somewhat lower speed than the coupling casing connected with the primary blade carrying hub. Accordingly the transmission liquid located in the scoop tube chamber is less effectively entrained in the circumferential direction than in the design shown in FIG. 1. Attempts were made to remedy this disadvantage by providing blades 23 not only on the casing wall normal to the axis but also on the casing wall parallel to the axis, such blades being intended to entrain the liquid in the scoop tube chamber. However, apart from added complexity of manufacture of the blades, this design modification did not suffice to effectively avoid the occurrence of pressure fluctuations in the tube system downstream from the scoop tube.

C. Design measures to deal with such fluctuations are also described in the German patent No. 764,378 whose hydrodynamic coupling has a scoop tube chamber delimited by two casing walls which are both attached to the primary blade carrying hub. For damping or preventing the said fluctuations there are rib-like internal structures in the scoop tube chamber arranged parallel to the axis so as to project radially inwards. A disadvantage of this design is again the high structural complexity in respect of the said two coupling casings and the rib-like internal structures.

Accordingly one object of the invention is to adopt measures in the design of a hydrodynamic coupling of the type in question which suppress the pressure fluctuations in the scoop tube and the tube system downstream therefrom while at the same time keeping to the simple coupling design, in which only a single casing is provided which is connected with the one coupling half and encompasses the other coupling half with the formation of the scoop tube chamber.

This object is to be attained by adopting the measures as recited in the characterizing part of claim 1, in accordance with which the rotating coupling casing, which delimits the scoop tube chamber in the outer direction, is provided on its inner, wet side with elongated depressions, which extend over the entire radial adjustment range of the scoop tube and, respectively, the area of contact with the transmission liquid. The effect of the groove-like depressions or slots is that the transmission liquid makes contact with a surface having an arbitarily created roughness. As a result entrainment of the liquid in the circumferential direction is ensured. This wold also appear to favor the even inflow of liquid to the inlet port of the scoop tube; for the pressure fluctuations so far occurring at the scoop tube are now suppressed, at least to a substantial extent.

There is also an improvement as compared with the prior art coupling of FIG. 2 of the German patent No. 977,505. It seems probable that in this design of coupling blades on the casing wall normal to the axis cause a radially outwardly directed flow of liquid which then induces the said pressure fluctuations. On the other hand the coupling has the numerous and comparatively fine groove-like depressions which seem to completely put and end to the said irregular transverse flow. Furthermore, the difference in speeds of rotation, which hitherto has been viewed as a disadvantage, between the casing wall on the one hand and the back side of the inner blade carrying hub on the other would not seem to cause any further trouble. Thus the known simple coupling design may be adhered to in which there is only one single casing.

A significant further principle further developing the notion of the invention is defined in claim 2, whose teaching is that the number of the slots on the inner wall face of the scoop tube chamber is disproportionately high. Tests on a coupling with an internal diameter of the scoop tube chamber of approximately 420 mm surprisingly showed that there was a complete suppression of the pressure fluctuations using for example 137 slots with an approximate breadth of 4 mm and a radial length of approximately 100 mm.

It is an advantage if the depressions are evenly and densely distributed on the inner face of the rotating casing, radial alignment of the depressions proving to lead to a more especially effective entrainment of the liquid. The inventor has been able to see that the arrangement of radial depressions in only one part of the rotating housing casing, namely preferentially in only one part of the rotating housing wall, is sufficient for reliable entrainment of the transmission liquid and the suppression of fluctuations. This housing wall may either be an outer housing wall of the scoop tube chamber or may be a partition between the scoop tube and the one coupling half. In order to prevent the generation of fluctuations by interfence between rotating parts and the casing the number of depressions is preferably a prime number, as for example 137 as mentioned earlier.

One working example of the invention will now be described with reference to the drawing in more detail.

Figure 1:
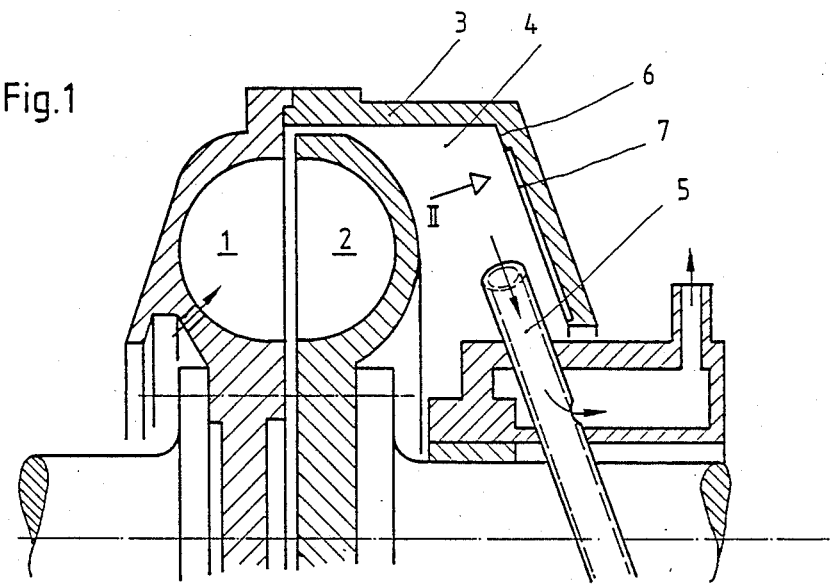
FIG. 1 is a cross section taken through a coupling.

FIG. 1 shows a coupling with a first coupling half 1 that is connected with a prime mover, not shown, and a second coupling half 2 for driving a load which is not shown. A coupling casing 3 fitting around the second coupling half 2 is connected with the first coupling half 1. This coupling casing 3 defines a scoop tube chamber 4 behind the second coupling half. During operation of the coupling this scoop tube chamber forms a rotating oil ring whose thickness is determined by the scoop tube 5 which continuously scoops up transmission liquid in accordance with its radial setting. In order to obtain a maximum intensiveness of the scooping of the transmission liquid from the rotating oil ring in the scoop tube chamber 4, it is necessary for the transmission liquid to move as far as possible at the same speed as the casing 3 itself. In accordance with the invention the inner surface 6 of the casing 3 rotating on the primary side is furnished with radially extending depressions 7. The same provide for a systematic increase in the roughness of the surface 6. On the other hand the simple configuration of the radial depressions 7 prevents an intensive pumping action in the radial direction which would otherwise make it likely for the transmission liquid within the oil ring to move irregularly on its own accord with some transverse currents, something that would hardly be conducive to an effective and even scooping up of the liquid. The purely radial arrangement of the depressions 7 thus leads to an essentially tangentially directed motion of the transmission liquid towards the scoop tube.

Figure 2:
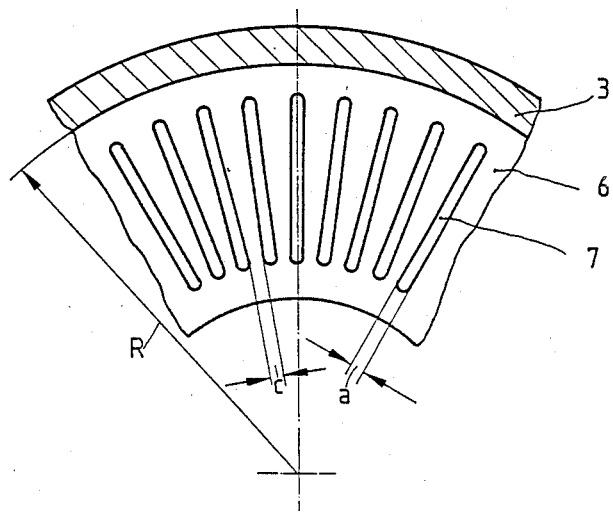
FIG. 2 is a surface view of the inner face of the coupling casing with the depressions in accordance with the invention.

FIG. 2 is a view of the inner face of the coupling casing 3. The reader will see that the radial depressions 7 are placed closely together and that they extend from the radially inner to the radially outer part of the coupling casing 3. It has been found to be an advantage if the ratio of the breadth a of the slots 7 to the maximum radius R of the scoop tube chamber 4 be between 1/40 and 1/60. It is furthermore expedient if the distance c between the slots 7 and their radially innermost end is approximately equal to the breadth a of the slots.

Figure 3:
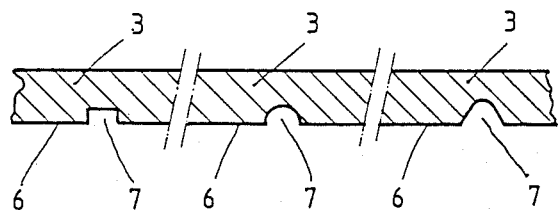
FIG. 3 shows possible forms of cross sections of the depressions.

FIG. 3 shows cross sections taken through the radial depressions. The latter may be made with a rectangular semi-circular or some sort of wedge-like cross section. The depressions 7 have a depth and breadth of only a few millimeters, the important feature being that the transition from the smooth surface 6 to the slot is made with a sharp edge.

The design of the slots in accordance with the invention ensures not only an efficient entrainment of the transmission liquid in the circumferential direction with a minimum pumping effect in the radially outward direction but also a reliable suppression of pressure fluctuations in the tube system.

What is claimed is:

1. A hydrodynamic coupling comprising two blade carrying coupling halves which together define a toroidal operating circuit, a coupling casing connected with the one coupling half and encompassing the other coupling half and a non-rotating scoop tube which is located in a scoop tube chamber formed between the rotary casing and the other coupling half, the position of the inlet port determining the degree of filling of the hydrodynamic coupling during operation thereof characterized by a plurality of elongated depressions, provided on the coupling casing (3) rotating with the one coupling half (1) and evenly distributed on the periphery, in the form of essentially radially extending slots (7), which extend as far as a position near the radially outermost part of the scoop tube chamber (4).

2. The hydrodynamic coupling as claimed in claim 1 characterized in that the ratio of the breadth (a) of the slots (7) to the spacing (c) between the slots at the radially inner end of the slots (7) is approximately equal to 1 and that the ratio of the breadth (a) of the slots (7) to the maximum inner radius (R) of the scoop tube chamber (4) is equal to at least 1/40 and preferably 1/60.

3. The hydrodynamic coupling as claimed in claim 2 characterized in that the radial slots (7) extend over a radius range which corresponds to the range of adjustment of the inlet port of the scoop tube (5).

4. The hydrodynamic coupling as claimed in claim 1 characterized in that the number of the radial depressions (7) is a prime number.

5. The hydrodynamic coupling as claimed in claim 1 characterized in that the transition from the slot (7) to the inner surface (6) of the coupling casing (3) is in the form of a sharp edge.

6. The hydrodynamic coupling as claimed in claim 1 wherein the radial slots extend over a radius range which corresponds to the range of adjustment of the inlet port of the scoop tube.

7. The hydrodynamic coupling as claimed in claim 2 wherein the number of the radial slots is a prime number.

8. The hydrodynamic coupling as claimed in claim 3 wherein the number of the radial slots is a prime number.

9. The hydrodynamic coupling as claimed in claim 2 wherein the transition from the one slot to the inner surface of the coupling casing is in the form of a sharp edge.

10. The hydrodynamic coupling as claimed in claim 3 wherein the transition from the one slot to the inner surface of the coupling casing is in the form of a sharp edge.

11. The hydrodynamic coupling as claimed in claim 4 wherein the transition from the one slot to the inner surface of the coupling casing in the form of a sharp edge.

* * * * *